(No Model.)
N. B. & J. B. ROBINSON.
CULTIVATOR.
No. 495,207. Patented Apr. 11, 1893.
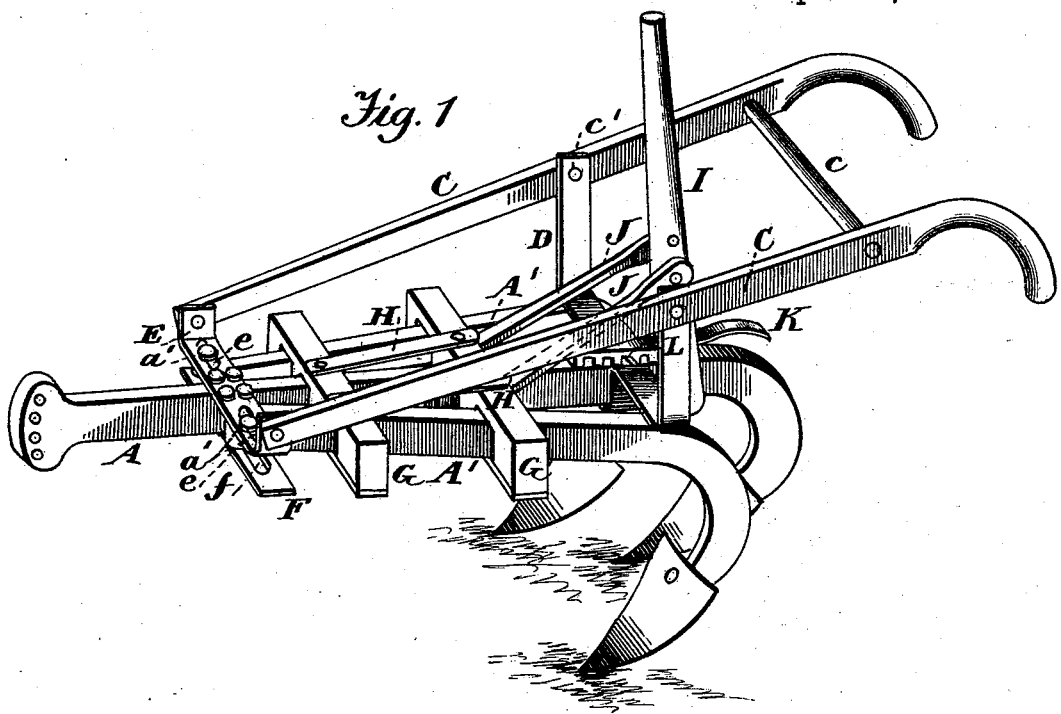
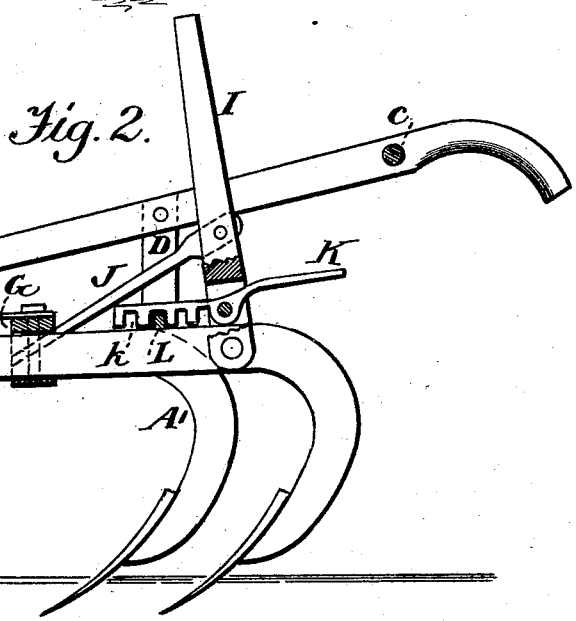
Witnesses.
A. Ruppert
G. B. Towles
Inventors.
Nelson B. Robinson,
John B. Robinson,
Per
Thomas P. Simpson.
Atty.
THE NORRIS PETERS CO., PHOTO-LITHO., WASHINGTON, D. C.

(No Model.)
2 Sheets—Sheet 2.
C. SCHOLTZ.
MANUFACTURE OF BALE TIE HOOKS AND APPARATUS THEREFOR.
No. 495,208.
Patented Apr. 11, 1893.
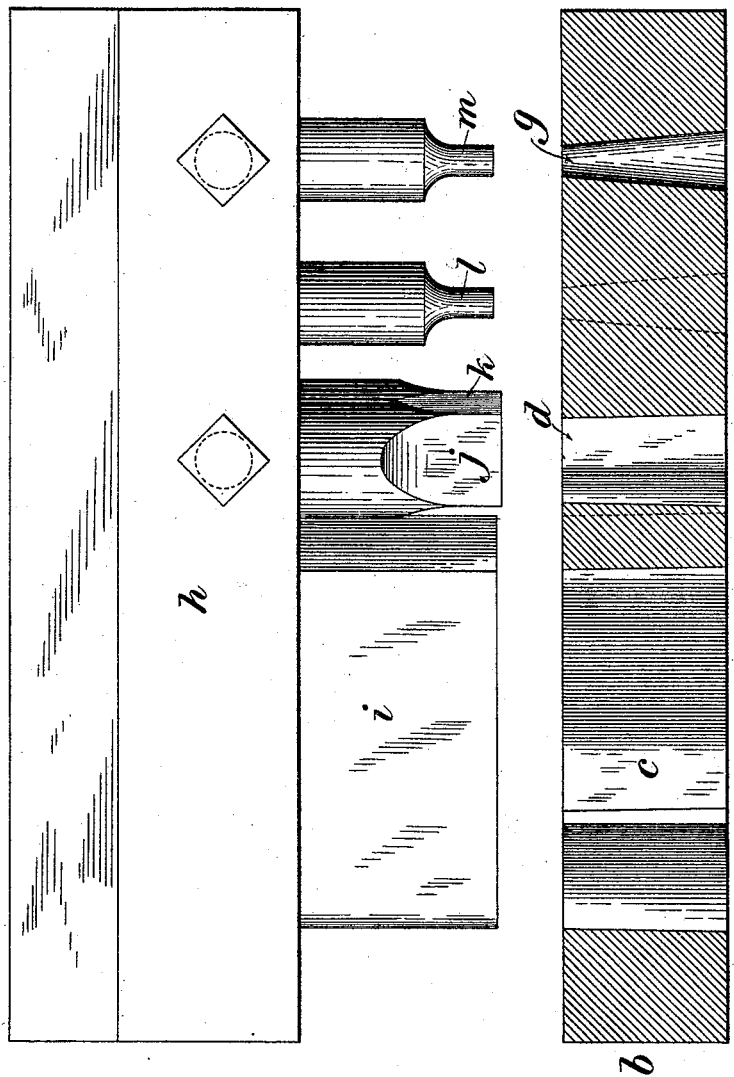

UNITED STATES PATENT OFFICE.

CHARLES SCHOLTZ, OF PITTSBURG, PENNSYLVANIA, ASSIGNOR TO EDWARD L. CLARK, OF SAME PLACE.

MANUFACTURE OF BALE-TIE HOOKS AND APPARATUS THEREFOR.

SPECIFICATION forming part of Letters Patent No. 495,208, dated April 11, 1893.

Application filed October 5, 1892. Serial No. 447,888. (No model.)

*To all whom it may concern:*

Be it known that I, CHARLES SCHOLTZ, of Pittsburg, in the county of Allegheny and State of Pennsylvania, have invented a new and useful Improvement in the Manufacture of Bale-Tie Hooks and Apparatus Therefor, of which the following is a full, clear, and exact description, reference being had to the accompanying drawings, forming part of this specification, in which—

Figure 1 is a plan view of a strip of metal used in the manufacture of bale-tie hooks, illustrating the method of cutting out the hooks. Fig. 2 is a plan view of a finished hook. Fig. 3 is a plan view of the female die used in cutting out the hooks. Fig. 4 is a vertical section of the female die on the line IV—IV of Fig. 3, the male die being shown in side elevation.

My invention relates to an improvement in the manufacture of bale-tie buckles, composed of two similar hook-shaped pieces of metal which are hinged together at their butts, and thus constitute a delta-shaped fastening device which engages and holds a loop at the end of the bale band. One of the hooks is shown in Fig. 2, in which 2 indicates the shank of the hook, having a tongue 3 extending at an acute angle to the shank, the end of the shank being widened to afford greater strength, and provided with a hole 4, through which passes the rivet holding the two hooks pivotally together. To insure a proper distribution of the strain of the bale-band on its hooks, the shank extends at such an angle to the tongue that the hole 4 shall be substantially in a perpendicular let fall from the center of the tongue. Heretofore, these hooks have been made either by punching them out singly from strips of sheet-metal, or by bending to finished form sheet-metal blanks, originally straight or cut to approximately the shape desired. The first of these modes of manufacture involves a very considerable waste of material, and the second, by requiring a bending operation, weakens the hooks, makes them unduly costly in manufacture and diminishes the manufacturer's profits.

It is the object of my present invention to provide means by which the hooks can be cut out from sheet metal blanks and reduced to final form without substantial waste of metal, and without the necessity for subsequent bending and shaping.

In the manufacture of the hooks, I take a sheet metal strip of twice the average width of the shank of the hook desired, and by means of dies, preferably constructed as hereinafter described, I cut out the hooks therefrom on lines 5, 6, which extend obliquely across the strip, and on lines 6', 7, 8, 9, 10, 11, the lines 6', 7, 10, 11, being also at an oblique angle, as shown. The consequence is that the hooks produced by the cuts are of the proper final shape, and, as will be seen, are produced without waste of metal. I prefer, however, to cut out by the same operation by which the hooks are cut, triangular pieces 5, 12, 13, and 6, 14, 15, at the ends of the lines 5, 6, thus removing surplus and useless metal from the shoulders of the hooks. The holes 16, at the end portions of the hooks, may be punched at the same operation by which the hooks are cut.

It will be noticed that the lines 5, 6, and 6', 7, which form the outer and inner lines of the hook portion, extend at oblique angles to the marginal line of the strip, and that outside lines of the hooks are coincident with or formed by said marginal lines. These are distinguishing features of the invention and make possible the formation of the hook in accordance with my invention.

I shall now describe the dies which I prefer to use for this purpose.

*b* is the female die, having a cavity *c*, whose outline is the same as that of the lines 5, 6, 6', 7, 8, 9, 10, 11, in Fig. 1, and at one end of this cavity are two opposite triangular cavities *d*, *e*, of the shape and relative position of the opposite triangular sections at the opposite sides of the strip shown in Fig. 1. Beyond these triangular cavities are punch holes *f*, *g*, of the size and relative position corresponding with the two adjacent punch holes 16 of Fig. 1.

*h* is the male-die-head, having projecting die punches *i, j, k, l, m*, corresponding to the cavities of the female die. The male die-head is actuated by suitable mechanism so as to be reciprocated to and from the female die, and the machine may be fed by hand, but preferably is provided with feed-rollers, by which the metal strip is fed forward at each reciprocation a distance equal to the length of one of the hooks. Thus, suppose the uncut strip to be introduced between the dies, the first descent of the male die cuts out the triangular sections, and punches the holes; at the next feeding the strip is cut on the lines 12, 6, 6', 7, 8, 9, 10, 11, 13; and so on, each cutting of the dies, after the first, severing two of the hooks.

The advantages of my invention will be appreciated by those skilled in the art.

The apparatus may be modified in some respects without departing from my invention as stated in the following claims, since

What I claim is—

1. The method hereinbefore described, of cutting bale-tie hooks, which consists in cutting them out of a strip at least substantially twice the average width of the hook's shank by transverse oblique cuts constituting the outlines of the hook portion and the rear line of the butt of the hook, and by longitudinal cuts constituting the inner lines of the hook shank; substantially as and for the purposes described.

2. The method hereinbefore described of cutting bale-tie hooks, which consists in cutting them out of a strip at least substantially twice the average width of the hook's shank by transverse oblique cuts constituting the outlines of the hook portion and the rear line of the butt of the hook, and by longitudinal cuts constituting the inner lines of the hook shank, and exsecting portions of the strip at the ends of the longer oblique cuts; substantially as and for the purpose described.

3. A die having a punching cavity having its shank-forming portion formed with a straight lateral outline, and a hook-cavity projecting obliquely therefrom; substantially as and for the purposes described.

4. A die having a hook-punching cavity whose hook-portion is oblique to the shank, and cavities adapted to exsect pieces registering in position with the ends of the line of the oblique hook; substantially as and for the purposes described.

5. A die having a hook-punching cavity whose hook portion is oblique to the shank, and cavities adapted to exsect pieces registering in position with the ends of the line of the oblique hook, the latter named die cavities being set in rear of the other cavity, and adapted to exsect said pieces before the blank is cut by the hook-cavity; substantially as and for the purposes described.

6. A die having a hook-punching cavity whose hook portion is oblique to the shank, cavities adapted to punch holes in the blank, the latter named die-cavities being set rear of the other die-cavity and adapted to punch such holes before the blank is cut by the hook cavity; substantially as and for the purposes described.

In testimony whereof I have hereunto set my hand this 24th day of September, A. D. 1892.

CHARLES SCHOLTZ.

Witnesses:
 THOS. MCCAFFREY,
 GEO. W. KEMP.